US009561530B1

(12) United States Patent
Kinsman et al.

(10) Patent No.: US 9,561,530 B1
(45) Date of Patent: Feb. 7, 2017

(54) METHOD FOR THE IN SITU REMEDIATION OF CONTAMINANTS

(71) Applicant: ORIN TECHNOLOGIES, LLC., Verona, WI (US)

(72) Inventors: Larry Kinsman, Verona, WI (US); Adam Mohs, Sartell, MN (US)

(73) Assignee: ORIN TECHNOLOGIES, LLC, Verona, WI (US)

( * ) Notice: Subject to any disclaimer, the term of this patent is extended or adjusted under 35 U.S.C. 154(b) by 0 days.

(21) Appl. No.: 14/734,597

(22) Filed: Jun. 9, 2015

Related U.S. Application Data

(60) Provisional application No. 62/009,591, filed on Jun. 9, 2014, provisional application No. 62/009,596, filed on Jun. 9, 2014.

(51) Int. Cl.
*A62D 3/38* (2007.01)
*B09C 1/08* (2006.01)
*B09C 1/10* (2006.01)
*C02F 1/28* (2006.01)
*C02F 1/72* (2006.01)
*C02F 1/20* (2006.01)
*C02F 103/06* (2006.01)
*C02F 101/32* (2006.01)
*C02F 101/10* (2006.01)

(52) U.S. Cl.
CPC . *B09C 1/08* (2013.01); *B09C 1/10* (2013.01); *C02F 1/20* (2013.01); *C02F 1/283* (2013.01); *C02F 1/725* (2013.01); *B09C 2101/00* (2013.01); *C02F 2101/10* (2013.01); *C02F 2101/322* (2013.01); *C02F 2103/06* (2013.01); *C02F 2303/02* (2013.01); *C02F 2305/023* (2013.01); *C02F 2307/00* (2013.01)

(58) Field of Classification Search
CPC ....................................................... A62D 3/38
USPC ........................................................ 588/313
See application file for complete search history.

(56) References Cited

U.S. PATENT DOCUMENTS

| | | | |
|---|---|---|---|
| 1,958,204 | A | 5/1934 | Reichert |
| 3,607,053 | A | 9/1971 | Reilly |
| 3,865,628 | A | 2/1975 | Callahan et al. |
| 4,144,179 | A | 3/1979 | Chatterji |
| 4,434,069 | A | 2/1984 | Fairchild |
| 5,055,139 | A | 10/1991 | Personette |
| 5,314,022 | A | 5/1994 | Cowan et al. |
| 5,330,581 | A | 7/1994 | Syrinek |
| 5,430,237 | A | 7/1995 | Sharp |
| 5,624,886 | A | 4/1997 | Dawson et al. |
| 5,741,427 | A | 4/1998 | Watts et al. |
| 6,602,181 | B2 | 8/2003 | Quintero et al. |
| 6,668,947 | B2 | 12/2003 | Cordova |
| 6,695,077 | B2 | 2/2004 | Szymocha et al. |
| 6,797,675 | B2 | 9/2004 | Von Krosigk |
| 7,361,280 | B2 | 4/2008 | Baker |
| 7,524,141 | B2 | 4/2009 | Sethi et al. |
| 7,621,335 | B2 | 11/2009 | Valeriano et al. |
| 7,662,294 | B1 | 2/2010 | Cox |
| 7,712,535 | B2 | 5/2010 | Venditto et al. |
| 7,745,680 | B1 | 6/2010 | Cox |
| 7,923,417 | B2 | 4/2011 | Sanders et al. |
| 8,367,589 | B2 | 2/2013 | Li et al. |
| 8,480,903 | B1 | 7/2013 | Taylor |
| 2007/0053748 | A1 | 3/2007 | Luthy et al. |
| 2013/0248461 | A1 | 9/2013 | Pisanova et al. |

FOREIGN PATENT DOCUMENTS

WO          99/54258          10/2013

OTHER PUBLICATIONS

Wikipedia, Drilling Fluid, http://en.wikipedia.org/wiki/Drilling_fluid.
PetroWiki, Society of Petroleum Engineers, Drilling Fluid Types. Sep. 12, 2013, http://petrowiki.org/Drilling_fluid_types.
Argonne National Laboratory, Drilling Waste Management Technology Descriptions, http://web.ead.anl.gov/dwm/techdesc/index.cfm.
Environmental Protection Agency, Paint Filter Liquids Test Method 9095B, Nov. 2004, http://www.epa.gov/osw/hazard/testmethods/sw846/pdfs/9095b.pdf.
Rongjun Biana Stephen Joseph, Liqiang Cui, Genzing Pan, Lianqing Li, Xiaoyu Liu, Helen Rutledge, Singwei Wong, Chee Chia, Chris Marjo, Bin Gong, Paul Munroe, Scott Donne, A three-year experiment confirms continuous immobilization of cadmium and lead in contaminated paddy field with biochar amendment, Journal of Hazardous Materials, vol. 272, May 2014.
G. Fellet L. Marchiol, G. Delle Vedove, A. Peressotti, Application of Biochar on Mine Tailings: Effects and Perspective for Land Reclamation, Chemosphere, vol. 83, Issued 9, May 2011.
Kelly Charlene N., Peltz Christopher D., Stanton Mark, Rutherford David W., and Rostad Colleen E., Biochar application to hardrock mine tailings: Soil quality, microbial activity, and toxic element sorption Applied Geochemistry, vol. 43, Apr. 2014.
Oh Seok-Young, Moon Myong-Keun, Biochar for Treating Acid Mine Drainage, Environmental Engineering Science., vol. 30, Issue 10, Oct. 2013.
Jingchun Tang Wenying Zhu, Rai Kookana, Arata Katayama, Characteristics of biochar and its application in remediation of contaminated soil, Journal of Bioscience and Bioengineering, vol. 116, Issue 6, Dec. 2013.
Jya-Jyun Yu Shinn-Yow Chou, Contaminated Site Remedial Investigation and Feasibility Removal of Chlorinated Volitile Organic Compounds from Groundwater by Activated Carbon Fiber Adsorption, Chemosphere vol. 41, Issue 3, Aug. 2000.

(Continued)

Primary Examiner — Edward Johnson
(74) Attorney, Agent, or Firm — Boyle Fredrickson, S.C.

(57) ABSTRACT

A method of in situ remediation of an organic contaminant through the formation of a subsurface treatment zone defined by a injection biochar slurry that concentrates the organic contaminate and catalyzes the formation of free radical of an oxidizing agent. An in situ organic contaminant remediation composition including biochar particles and a persulfate oxidizing agent is also provided.

21 Claims, 1 Drawing Sheet

(56) References Cited

OTHER PUBLICATIONS

Emily Lassiter Zachary M. Easton, Denitrifying Bioreactors: An Emerging Best Management Practice to Improve Water Quality, Virginia Cooperative Extension, Communication and Marketing, College of Agriculture and Life Sciences, Virginia Polytechnic Institute and State University, vols. BSE-55P, 2013.

Wujcik W. J., Lowe, W. L., Marks, P. J. and Sisk, W. E, Granular Activated Carbon Pilot Treatment Studies for Explosives Removal from Contaminated Groundwater, Environmental Progress & Sustainable Energy, vol. 11, Issue 3, 1992.

Hipp J. A. et al., Optimization of Stormwater Filtration at the Urban/Watershed Interface, Urban Water Research Center. UC Irvine, 2009.

Sneath H., Wingate J, Hutchings T., and De Leij F., Remediation of Metal, Arsenic and Phenanthrene Contaminated Soil Using Charcoal and Iron Filings, Geochimica Et Cosmochimica Acta., vol. 73., 2009.

Han I,. Schlautman, M. A., Batchelor, B., Removal of Hexavalent Chromium from Groundwater by Granular Activated Carbon, Water Environment Research, vol. 71, Issue 1, 2000.

McKinnon R., Dyksen, J., Removing Organics from Groundwater Through Aeration Plus GAC, Journal of American Water Works Association; vol. 76, Issue 5, 1984.

Edwards A.C and P.J.A. Withers, Soil phosphorus management and water quality, Soil Use and Management, vol. 14, 1998.

Beaton J. D., Peterson, H. B., and Bauer, N., Some Aspects of Phosphate Adsorption, Soil Science Society of America, Proceedings, vol. 24, 1960.

Zheng Zeng Song-Da Zhang, Ting-Qiang Li, Feng-Liang Zhao, Zhen-Li He, He-Ping Zhao, Xiao-E Yang, Hai-Long Wang, Jing Zhao, Muhammad Tariq Rafiq, Sorption of ammonium and phosphate from aqueous solution by biochar derived from phytoremediation plants, Journal of Zhejiang University, vol. 14, Issue 12, 2013.

Robert Parette Fred S. Cannon, The Removal of Perchlorate from Groundwater by Activated Carbon Tailored with Cationic Surfactants, Water Research, vol. 39, Issue 16, 2005.

Zhang Xiaokai, Wang Hailong: He Lizhi, Lu Kouping, Sarmah Ajit, Li Jianwu, Bolan Nanthi S., Pei Jianchuan, and Huang Huagang, Using biochar for remediation of soils contaminated with heavy metals and organic pollutants, Environmental Science and Pollution Research, vol. 20, Issue 12, 2013.

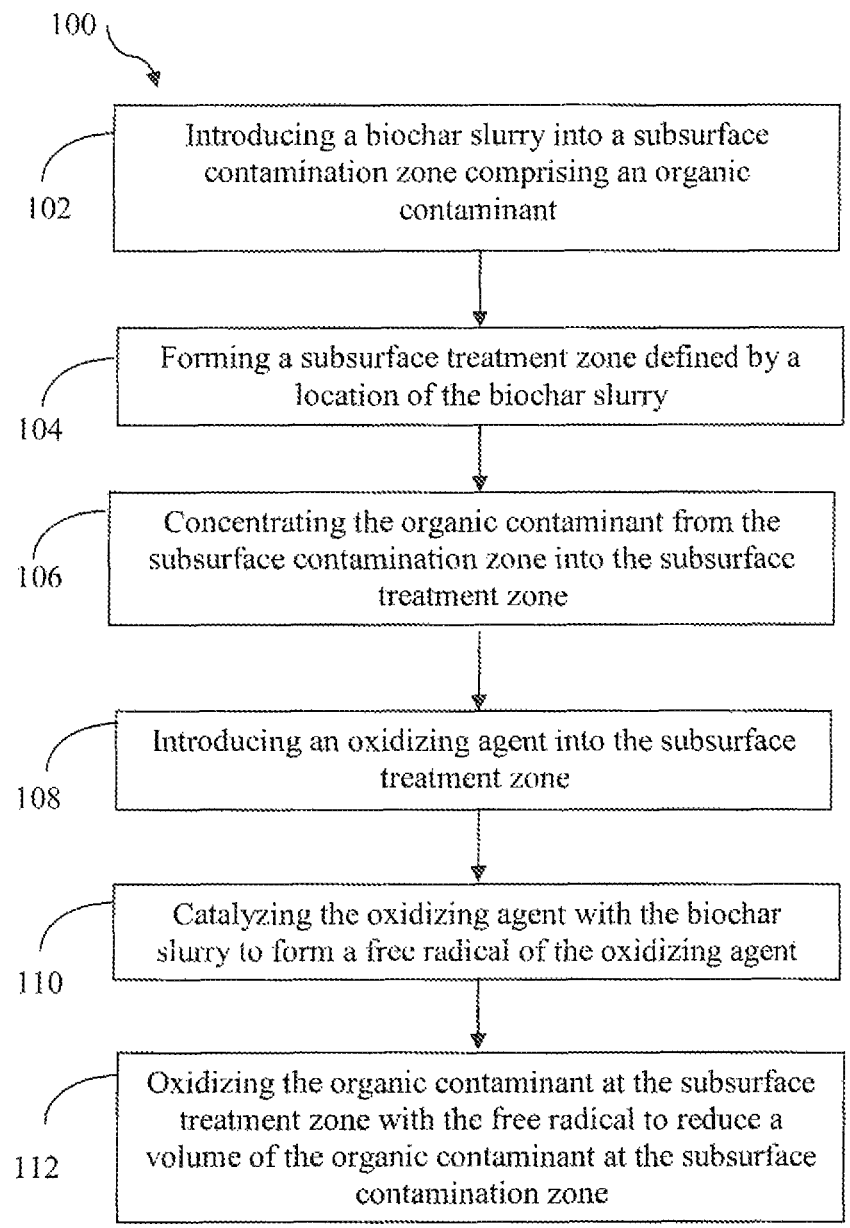

METHOD FOR THE IN SITU REMEDIATION OF CONTAMINANTS

CROSS-REFERENCE TO RELATED APPLICATIONS

This application claims priority to U.S. provisional patent application Ser. Nos. 62/009,591 and 62/009,596 both filed Jun. 9, 2014, the entire contents of which are both incorporated herein by reference.

BACKGROUND OF THE INVENTION

1. Technical Field

The present invention relates to a method and composition for remediating subsurface contaminants from soil and groundwater, and more specifically, the present invention describes a method and composition for the in situ remediation of contaminants through the administration of a composition including a biochar and an oxidizing agent, wherein the biochar is both an absorbent medium and a catalyst for the oxidation of organic contaminants.

2. Background Art

The discharge of organic compounds and other contaminants into the soil and surface water can lead to contamination of surface and groundwater sources resulting in potential public health impacts. Treatment of such wastewater and the remediation of soils and groundwater contaminated with organic compounds and other contaminants has been expensive, require considerable time, and in many cases are incomplete or unsuccessful.

Many different physical techniques and methods exist for the remediation of soil, groundwater and wastewater to meet the clean-up standards. Examples include dig-and-haul, pump-and-treat, biodegradation, sparging, and vapor extraction. However, meeting stringent clean-up standards is often costly, time-consuming, and often ineffective for many compounds that are recalcitrant, i.e., not responsive to such treatment. Such drawbacks are particularly true of techniques that require contaminated areas to be removed prior to treatments, i.e., ex situ methods, such as is dig-and-haul and pump-and-treat methods. Accordingly, there is a need for an effective method and composition for remediation that treats contaminates in place, i.e., in situ, and does not require movement or prior extraction of the contaminated environmental media prior to treatment.

Aside from the particular physical techniques employed in remediation, chemical oxidation, using traditional oxidation methods or advanced oxidation processes (AOPs), is one remediation approach employed to treat organic contaminants with strong oxidizing chemicals for the purpose of complete mineralization or conversion of such organic contaminants to carbon dioxide and water.

For example, the use of hydrogen peroxide, and in particular metal-activated hydrogen peroxide, often referred to as Fenton's chemistry, has previously been employed in field application of chemical oxidation remediation to produce hydroxyl radicals that are relatively strong oxidants. Metals and chelated metals have also been utilized to catalyze the formation of such hydroxyl radicals, which are capable of destroying a wide range of contaminants. Other catalyzation methods have also been developed with the same goal of forming free radicals capable capable of destroying a wide range of contaminants. These types of oxidation processes have previously been used in both remediation and wastewater treatment systems.

In addition to the general oxidation chemistries described above, the use of persulfate salts for the removal of organic contaminants is also well known. Various methods have also been designed to improve the performance of persulfate salts using a number of various catalytic systems for soil and groundwater remediation and may be applied both in situ and ex situ.

One short coming of such current remediation techniques is that the treatment and remediation of compounds that are either partially or completely immiscible with water, i.e., Non Aqueous Phase Liquids or "NAPLs", has shown to be particularly difficult. Similarly, treatment of highly soluble but biologically stable organic contaminants such as MTBE and 1,4-dioxane have also been shown to be quite difficult with conventional remediation technologies and wastewater treatment. This is particularly true if these compounds are not significantly naturally degraded, either chemically or biologically, in soil environments or biological reactors. Accordingly, despite prior advancements, an improved remediation method and composition is needed to remediate such contaminants.

In addition to the oxidative chemistries, activated carbon has become a popular option for the removal of various compounds both inorganic and organic. However, treatments involving activated carbon tend to be expensive due to the high cost of activated carbon itself. Accordingly, a non-cost prohibitive remediation additive with functional characteristics that are at least similar if not superior to that of activated carbon is needed.

As an alternative to activated charcoal, biochar has been shown to be an effective ex situ treatment for various contaminants such as agricultural runoff containing nitrates, phosphates, and ammonia, mine drainage and tailings containing various heavy metals and low pH, municipal storm water, general heavy metals removal and general organic compounds. To this end, biochar has the potential to be an effective environmental remediation tool for the remediation of contaminated soil and groundwater, whether by itself, embedded, or in conjunction with other treatments such as, reductive remediation methods (ZVM) and/or carbon sources, biological (microbial and/or nutrients) remediation methods, metal stabilization methods or combinations thereof occurring simultaneously or sequentially and the delivery of such systems by injection methods.

However, the need to introduce such material into subsurface contaminated areas for use in situ method remediation has been prohibitive of using biochar in such applications. Accordingly, there is still need for a composition and method for effectively introducing biochar into subsurface contamination areas for use in oxidative remediation of organic based contaminants.

SUMMARY OF THE INVENTION

The inventors have discovered that biochar can be rendered injectable into subsurface areas containing contaminants for remediation while maintaining effectiveness of the biochar as both an absorbent material and an oxidation catalyst. Such injectable biochar, i.e., biochar derived from biological sources and reduced to small particle size, may be used in the remediation of contaminated soil and ground water via subsurface injection, thereby defining a subsurface treatment zones appropriate for the remediation of contaminants in the surrounding and/or proximate subsurface contamination zone. Further, the subsurface injectable biochar may be used as a part of an in situ remediation composition and related method, which may further comprise zero valent metals (zvm), oxidation chemistries, reductive chemistries, biological inoculation consisting of nutrient systems and/or desired biological agents, additional a biomass products, or combinations thereof. The inventors have further discovered that peroxygens, and in one preferred embodiment persulfate salts, may be catalyzed by the addition of biochar derived from various biomass sources, for example wood based biochar.

In one embodiment, the present invention provides a method of in situ remediation of an organic contaminant including the steps of: (a) introducing a biochar slurry in a subsurface contamination zone comprising an organic contaminant (b) forming a subsurface treatment zone defined by a location of the biochar slurry; (c) concentrating the organic contaminant from the subsurface contamination zone into the subsurface treatment zone; (d) introducing an oxidizing agent into the subsurface treatment zone; (e) catalyzing the oxidizing agent with the biochar slurry to form a free radical of the oxidizing agent; and (f) oxidizing the organic contaminant at the subsurface treatment zone with the free radical to reduce a volume of the organic contaminant at the subsurface contamination zone.

The ability to introduce the biochar slurry into the subsurface is desirable because it allows for in situ remediation without the additional steps of removing contaminated environmental matter to be treated, and the related expense thereof.

Thus it is one object of the invention to provide a method wherein the biochar slurry comprises a mass of biochar particulates suspended in a volume of fluid carrier.

In one object of the invention a substantial portion of the biochar particles have a particle size of between 50 microns and 4000 microns as to facilitate its passage through a pumping apparatus, well, and/or subsurface penetration.

In another object of the invention a substantial portion of the biochar particles have a particle size of between 50 microns and 400 microns as to further facilitate its passage through a pumping apparatus, well, and/or subsurface penetration.

It is yet another object of the invention that the biochar constitute a catalyzing agent for the formation of free radicals of the oxidizing agent.

Accordingly, the oxidizing agent of the method of may be selected from a group comprising peroxygen, persulfate, permanganate, Fenton reagents, ozone, oxygen, or a combination thereof.

The free radicals of the oxidizing agent may further be selected from a group comprising a sulphate radical, a hydroxyl radical, or a combination thereof.

It is another object of the invention to provide a method of oxidizing an organic contaminant that has been concentrated at the treatment zone defined by the subsurface location of biochar.

Accordingly, the organic contaminant of the method may be 1,4-dioxane, a polychlorinated solvent, or a volatile organic compound (VOC) vapor, wherein the biochar absorbs the given organic contaminant.

In another object of the invention the present method reduced a pre-remediation volume of the given organic contaminant at the subsurface contamination zone percent to a non detectable level.

In another object of the invention the present method may include the introduction of a biological inoculation into the subsurface treatment zone, including a biological nutrient media and a selected microbial agent, which may utilize both aerobic and anaerobic microbes or bacteria.

As it is desirable that the oxidizing agent will substantially inhibit the growth or effectiveness of the selected microbial agent, it is a further object of the invention that the oxidation agent will be reduced to substantially zero prior to introducing the microbial agent into the subsurface treatment zone.

The present invention may also provide a composition for in situ organic contaminant remediation including a volume of biochar particulates configured to absorb a subsurface organic contaminant; a volume of a persulfate oxidizing agent activated by the biochar particulates to form free radicals of the persulfate oxidizing agent, wherein the free radicals of the persulfate oxidizing agent are configured to oxidize the subsurface organic contaminant absorbed by the biochar particulates.

In one object of the invention, the composition may also include a biochar slurry in which the biochar particulates are suspended in a fluid carrier.

In yet another object of the invention, the composition may also include a volume of a zero valent metal.

In yet another object of the invention, the composition may also include a biological nutrient media and an anaerobic microbial agent.

In still another object of the invention, the, the composition may also include a secondary oxidizing agent selected from a group comprising peroxygen, persulfate, permanganate, Fenton reagents, ozone, oxygen, or a combination thereof.

Further aspects or embodiments of the present invention will become apparent from the ensuing description which is given by way of example only.

BRIEF DESCRIPTION OF THE DRAWINGS

FIG. 1 is a flow chart showing the steps of a method in situ remediation of an organic contaminant according to one embodiment of the present invention;

DETAILED DESCRIPTION

Referring first to FIG. 1, a method 100 is shown for performing in situ remediation of an organic contaminant in accordance with one embodiment of the present invention. The first step of the method 100 is to introduce a biochar slurry into a subsurface contamination zone that includes at least one an organic contaminant, shown at block 102.

In one embodiment, the organic contaminant or contaminants to be remediated in accordance with the present invention may include, but are not limited to organic contaminants may include but are not limited to VOC's, semi-VOC's, pesticides, herbicides, fats, oils, grease, tars, chlorinated solvents trichloroethylene (TCE), vinyl chloride, tetrachloroethylene (PCE), methylene chloride, 1,2-dichloroethane, 1,1,1-trichloroethane (TCA), carbon tetrachloride, chloroform, chlorobenzenes, benzene, toluene, xylene, ethyl benzene, ethylene dibromide, methyl tertiary butyl ether, polyaromatic hydrocarbons, polychlorobiphenyls, phthalates, 1,4-dioxane, nitrosodimethyl amine, and methyl tertbutyl ether.

In one preferred embodiment, the claimed biochar slurry may include but is not limited to biochars formed from wood, grass, manure, grain husks, saw dust, etc. The biochars may be chars produced by conventional charring methods or alternatively within the scope of this invention, the biochars may be produced with an additional activation step such as acid treatment, high pressure steam, etc.

After introducing the biochar slurry, a subsurface treatment zone is formed that is defined by the location of the biochar slurry in the subsurface, as shown in block 104. At subsequent block 106, the organic contaminant that was located in the subsurface contamination zone is concentrating into the subsurface treatment zone. It is believed that the high surface are of the biochar component of the biochar slurry, as well as its molecular structure provides improved absorption of the organic contaminants relative to conventional activated charcoal. That is to say that the molecularly porous structure of biochar is configured to retain a larger volume of organic contaminants than is the relatively planner or flaky molecular structure of conventional activated carbon. Additionally, it is further believed that the abundance of carboxyl groups located on the surface of the biochar facilitates in immobilizing otherwise free moving contaminates from the subsurface contamination zone. Resultantly, the biochar's concentration, i.e., adsorption, or organic contaminants such as hydrocarbons, even when such contaminants are present at low aqueous concentrations in the subsurface contamination zone results in the concentration of the contaminants which increases the residence time of the organic contaminant in the vicinity of the free radical as will be discussed below at length. This concentration may reduce the required volume of oxidizing agent significantly, and particularly in applications with low aqueous contaminant concentrations At block 108, an oxidizing agent is introduced into the subsurface treatment zone. While FIG. 1 illustrated that the oxidizing agent is introduced after the biochar slurry has been introduced and the subsurface treatment zone formed, the present invention is no way limited to this embodiment. It is also considered within the scope of the present invention that the oxidizing agent and biochar slurry may be introduced simultaneously into the subsurface contamination area. Alternatively, the oxidizing agent may also be introduced into the subsurface prior to introducing the biochar slurry.

In one embodiment of the present invention the oxidizing agent may include ozone, oxygen, air, permanganates, persulfates, monopersulfates, dipersulfates, sodium persulfate, potassium persulfate, ammonium persulfate peroxides, hydrogen peroxide, persulfate salts, percarbonate salts, perborate salts, inorganic peroxides, organic peroxides and combinations thereof. In one preferred embodiment, as will be described in further detail below, the oxidizing agent may be sodium persulfate.

At subsequent block 110, the biochar contained within the biochar slurry catalyzes, i.e., activates the oxidizing agent, to form one or more free radicals of the oxidizing agent. In the non-limited example of sodium persulfate as the oxidizing agent, the resultant free radicals may include sulphate radicals, hydroxyl radicals, and/or a combination thereof. While the specific method of catalyzation is not presently known, it is believed that the relatively high concentration of hydroxyl groups found on the surface of the biochar facilitates the catalyzation of free radical formation, particularly relatively to the lower concentration of hydroxyl groups found on the surface of conventional activated carbon.

At the final block 112, the organic contaminants, which have either been concentrated in the subsurface treatment zone by way of interaction with the biochar slurry or are freely moving contaminants within the subsurface treatment zone, are oxidized by way of interaction with the free radicals. As a result the volume of the organic contaminant at the subsurface contamination zone is reduced. In one embodiment, the quantity of oxidizing agent, e.g., persulfate is introduced into the subsurface treatment zone at block 108 is sufficient to overcome soil oxidant demand and oxidize all of the organic contaminants present.

In one embodiment of the present method 100, the biochar slurry is further configured to be introduced, into the subsurface contamination area via injection. Such injection may include the formation of a biochar slurry that includes a mass of biochar particulates suspended in a volume of fluid carrier, including but not limited to water, viscosifying or viscosity increasing agents, high pressure gases such as air, nitrogen, ozone, etc. The method for injecting the biochar slurry may include a direct push method via a geoprobe, a temporary injection well, and/or a permanent well. The present invention has identified that in order to introduce biochar particles into the depths of subsurface contamination areas while simultaneously maintaining the effectiveness of the biochar as both a catalyst and absorbent material, a substantial portion of the biochar particles of the present invention have a particle diameter of preferably between 50 microns and 4000 microns, and more preferably between 50 microns and 400 microns. While these particle diameters are included herein as one embodiment of the present invention, it should be understood that the invention need not be limited to such dimensions. Rather, any diameter of biochar particles that is configured to be injected into the subsurface under pressures ranging from relatively low, i.e., 4 psi, to relatively high, i.e., 10,000 psi, while simultaneously maintaining effectiveness of the biochar as both a catalyst and absorbent material is considered within the scope of the invention.

In one embodiment of the method 100, the organic contaminant at the subsurface treatment zone is 1,4-dioxane. In this embodiment, the pre-remediation volume of 1,4-dioxane at the subsurface contamination zone is reduced in mass to a non-detectable level, and in one embodiment by at least the applicable treatment site specific limit. Furthermore, concentration of the 1,4-dioxane, in block 106 of the method 100 includes absorbing the 1,4-dioxane in mass with the biochar slurry, and in one embodiment absorbing the 1,4-dioxane within the biochar slurry to at least a non-detectable limit.

In another embodiment of the method 100, the organic contaminant at the subsurface treatment zone is a polychlorinated solvent. In this embodiment, the pre-remediation volume of the polychlorinated solvent at the subsurface contamination zone is reduced in mass to a non-detectable level, and in one embodiment by at least the applicable treatment site specific limit. Furthermore, concentration of the polychlorinated solvent, in block 106 of the method 100 includes absorbing the polychlorinated solvent in mass with the biochar slurry, and in one embodiment absorbing the polychlorinated solvent within the biochar slurry to at least a non detectable limit.

In yet another embodiment of the method 100, the organic contaminant at the subsurface treatment zone is a volatile organic compound vapor. In this embodiment, the pre-remediation volume of the volatile organic compound vapor at the subsurface contamination zone is reduced in mass to a non-detectable level, and in one embodiment by at least the applicable treatment site specific limit. Furthermore, concentration of the volatile organic compound vapor, in block 106 of the method 100 includes absorbing the volatile organic compound vapor in mass with the biochar slurry and in one embodiment absorbing the volatile organic compound vapor within the biochar slurry to at least a non-detectable limit.

In still another embodiment, the method 100 may include the introduction of a biological inoculation into the subsurface treatment zone. Such an inoculation may include a culture of one or more selected microbial agents and/or a supporting biological nutrient media, such as a liquid agar or molasses. The selected microbial agent is preferably an anaerobic microbe or bacteria that will proliferate and perform bioremediation of organic contaminants. When used in combination with an oxidizing agent it is preferred that the introduction of active cultures be performed either before or after the introduction of the oxidizing agent, which may otherwise inhibit or adversely affect the growth and efficiency of such live cultures. Furthermore, additional nutrients could be injected periodically throughout the remediation process to promote prolonged bioremediation.

In still another embodiment, the method 100 may also include the step of introducing a zerovalence metal (ZVM) such as iron (ZVI) to be injected into the desired subsurface treatment zone. In such an embodiment, chlorinated solvents such as TCE will be concentrated, i.e., adsorbed, by the biochar slurry and also dechlorinated by reaction with the XVi. In this embodiment, the biochar increases the residence time of the organic contaminant in the vicinity of the ZVI as to increase the likelihood of contact with the dechlorinating chemistry.

While a method 100, shown in FIG. 1 is directed to a method of performing in situ remediation of an organic contaminant in accordance with one embodiment of the present invention, a method of ex situ remediation of an organic contaminant is also considered within the scope of the present invention that, and in keeping with the general method 100. In a method of ex situ remediation according to the present invention, organically contaminated environmental material, i.e., water, waste water, soil, or a combination thereof, constituting the contamination zone is removed from the subsurface and transported to a treatment site. A biochar slurry is introduced to the contaminated environmental material, which includes at least one organic contaminant. After introducing the biochar slurry, a subsurface treatment zone is formed that is defined by the location of the biochar slurry in the environmental material, and may constitute the entire volume of environmental material that has been removed for remediation treatment. The organic contaminant that was located in the contaminated environmental material is then concentrating into the treatment zone. An oxidizing agent is introduced into the treatment zone where the biochar contained within the biochar slurry catalyzes, i.e., activates, the oxidizing agent, to form one or more free radicals of the oxidizing agent. The organic contaminants, which have either been concentrated in the treatment zone by way of interaction with the biochar slurry or are freely moving contaminants within the treatment zone, are oxidized by way of interaction with the free radicals. This results in a mass reduction of the volume of the organic contaminant at the contamination zone. The treated environmental media may then be returned to the location from which it was previously removed, or otherwise relocated elsewhere. This method of ex situ remediation may be further combined, modified or varied to accommodate those additional steps or features discussed herein.

Additionally, the present invention is also directed to a composition configured to exercise the methods described above. Namely, the present invention includes an in situ organic contaminant remediation composition, that includes a volume of biochar particulates configured to absorb a subsurface organic contaminant; a volume of a persulfate oxidizing agent activated by the biochar particulates to form free radicals of the persulfate oxidizing agent, and wherein the free radicals of the persulfate oxidizing agent are configured to oxidize the subsurface organic contaminant absorbed by the biochar particulates. Such a composition may similarly be applied to ex situ remediation methods in accordance with the description provided above. Furthermore, this composition may be further combined, modified or varied to accommodate those additional features discussed herein.

Turning now to the following examples, numerous laboratory experiments were performed, the results of which are provided below illustrating various components of the present invention.

Example 1

In Example 1, five sodium persulfate solutions (oxidizing agents) were made using 100 mL of tap water and 18 g of sodium persulfate. These samples were identified as sample 1-5, as shown below in Table 1. Sample 1 was a control and no additional chemicals were added to this sample. Samples 2, 3, and 4 received biochar doses of 5 g, 15 g, and 25 g respectively. By way of comparison, Sample 5 received 20 µl of 50% sodium hydroxide, which is a known catalyst of sodium persulfate via elevation of pH. The addition of sodium hydroxide to Sample 5 results in a pH of 11, which is sufficient to catalyze the oxidation of sodium persulfate.

The oxidation reduction potential (ORP) of each sample was recorded at various times over an eleven day period. The results are displayed in Table 1 as normalized ORP values. All ORP values were normalized to the ORP value of 1.00 relative to the Day 0 value of the control, Sample 1.

TABLE 1

| Sample | Biochar Concentration | Sodium Hydroxide | Normalized oxidation reduction potential | | | | | | |
|---|---|---|---|---|---|---|---|---|---|
| | | | Day 0 | Day 1 | Day 1 | Day 4 | Day 6 | Day 8 | Day 11 |
| 1 | 0 | 0 | 1.00 | 1.00 | 1.00 | 1.00 | 1.00 | 1.00 | 1.00 |
| 2 | 5 | 0 | 1.13 | 1.31 | 1.39 | 1.41 | 1.62 | 1.44 | 1.41 |
| 3 | 15 | 0 | 1.32 | 1.12 | 1.15 | 1.28 | 1.20 | 1.11 | 1.28 |
| 4 | 25 | 0 | 1.48 | 1.61 | 1.57 | 1.15 | 1.02 | 0.94 | 0.99 |
| 5 | 0 | 20 | 0.95 | 0.87 | 0.87 | 0.83 | 1.01 | 0.73 | 0.69 |

As shown in Table 1, the ORP values for the biochar activated samples, namely Samples 2, 3, & 4, are all significantly higher than that of Sample 1, the control. The ORP values for the biochar activated samples, namely Samples 2, 3, & 4, are also significantly higher than Sample 5, the alkaline activated sample. As a result, the higher ORP values of Samples 2, 3, & 4 indicated that the sodium persulfate is being catalyzed into persulfate radicals by interaction with the biochar. The generation of such radicals can be harnessed to more efficiently oxidize organic compounds in the various mediums listed previously, with a similar volume of sodium persulfate relative to prior activation methods, namely, Sodium Hydroxide. Additionally, the ORP values remain fairly consistent over the eleven (11) day period in which the measurements were taken, as compared to the substantial decline exhibited in Sample 5 over the eleven (11) day period. This further indicates that the method and composition of the present invention, which utilizes biochar as an oxidative agent catalyst, namely sodium persulfate catalyst, remains an effective oxidizer over a prolonged period, which is particularly well suited for in situ remediation purposes.

Example 2

As was previously identified, dioxanes can be difficult organic contaminants to remove from aqueous solutions, such as in situ remediation of ground water and landfill leachate, due to their relatively high solubility. In Example 2, samples of landfill leachate contaminated with 1,4-Dioxane were obtained for testing. One sample was preserved with sodium bisulfate to inhibit change in the target compounds during the testing period, and the second sample received no preservative. Both samples were treated with 1.5% by weight of wood based biochar. The biochar remained in each vial with the aqueous sample and was sent to a lab for analysis. Analysis for 1,4-Dioxane was completed by using EPA Method 1624 Volatile Organic Compounds by Isotope Dilution gas chromatography and mass spectroscopy, which separates and then detects the compound of interest, namely 1,4-Dioxane. The results of this test are reproduces below in Table 2, which shows that the aqueous concentrations of 1,4-Dioxane have been reduced from 140 ppb to 2.0 ppb. This is a reduction of the aqueous concentration of 1,4-Dioxane by greater than 98%, in the presence of 1.5% by weight biochar. These results indicated that the biochar of the present invention is particularly well suited for absorption, i.e., concentration, of water soluble 1,4-Dioxane from aqueous solutions, and is particularly well suited for concentrating the organic contaminant 1,4-Dioxane in a subsurface treatment zone during in situ remediation of aqueous environmental media.

TABLE 2

| Sample Treatment | Preserved | 1,4 Dioxane (ppb) | % Reduction |
|---|---|---|---|
| Control | Yes | 140 | — |
| 1.5% by Weight Biochar | Yes | 2 | 98.6% |
| Control 2 | No | 130 | — |
| 1.5% by Weight Biochar | No | <.001 | >99 |

Example 3

In situ remediation is also well suited for combating the leaching of volatile organic compounds through groundwater, which can be a significant problem with when dealing with sites contaminated by such organic compounds. In Experiment 3, a sample of soil including various organic contaminants was divided into four 100 gram samples. One sample was left untreated, and marked as the control sample, while the other three each received one dose of a wood based biochar according to the present invention at a rate of 2% by weight. Wood biochar sample #1 included a substantial portion of the biochar particles have a particle size of between 50 microns and 4000 microns. Wood biochar samples #2 and #3 included a substantial portion of the biochar particles have a particle size of between 50 microns and 400 microns, but were obtained from different sources. Each sample was mixed and sent to a lab for analysis. The samples were analyzed using EPA Method 8260B Volatile Organic Compounds by gas chromatography and mass spectroscopy, which separates and then detects the compound of interest in order to determine concentrations of representative organic compounds. The results of these tests are shown below in Table 3 in a unit of parts per million and in which the term "ND" represented a value that was not detected. The samples were also analyzed using EPA Method 1311 Toxicity Characteristic Leaching Procedure (TCLP) in order to determine the likelihood of the migration of those organic compounds through groundwater. The results of these tests are shown below in Table 4 in a unit of parts per million and which the term "ND" represented a value that was not detected.

As can be seen in Table 3 below, a number of representative organic contaminant compounds were found to be present in the Control sample by Method 8260, in two of the three biochar treated samples all organic contaminants but for tetrachloroethene were taken to non-detect levels in the sample, and that the tetrachloroethene concentration was reduced by 84% and 89%, respectively. By using Method 1311, tetrachloroethene was shown in TCLP, as shown below in Table 4. All treated samples showed non-detect for TCLP of tetrachloroethene. These results indicated that the biochar of the present invention is particularly well suited for absorption, i.e., concentration, of VOCs from aqueous solutions, and as such is particularly well suited for concentrating the VOCs in a subsurface treatment zone during in situ remediation of aqueous environmental media.

TABLE 3

| VOCs (8260) | Control | Wood Biochar #1 | Wood Biochar #2 | Wood Biochar #3 |
|---|---|---|---|---|
| 1,2-Dichloroethene(Total) | ND | ND | 1.11 | ND |
| 1,2,4-Trimethylbenzene | 12.9 | ND | ND | ND |
| 1,3,5-Trimethylbenzene | 11.2 | ND | ND | ND |
| Ethylbenzene | 3.26 | ND | ND | ND |
| Tetrachloroethene | 493 | 51.3 | 92.5 | 78.6 |
| cis-1,2-Dichloroethene | ND | ND | 1.11 | ND |
| Toluene | 8.1 | ND | ND | ND |
| Trichloroethene | 8.78 | ND | ND | ND |
| Xylene (total) | 22.3 | ND | ND | ND |
| m,p-Xylene | 22.3 | ND | ND | ND |
| n-Propylbenzene | 9.13 | ND | ND | ND |

TABLE 4

| TCLP (1311) | Control TCLP | Wood Biochar #1 | Wood Biochar #2 | Wood Biochar #3 |
|---|---|---|---|---|
| Tetrachloroethene | 14.6 | ND | ND | ND |

Example 4

Polychlorinated solvents, such as PCE, have been widely used as industrial solvents, dry cleaning fluids, degreasers, etc. The common use of such chlorinated solvents has led to widespread environmental contamination in soil and groundwater, making their remediation particularly well suited for the present invention. A sample of PCE contaminated ground water was obtained to evaluate the efficiency of biochar in the removal, i.e., absorbance of PCE. Seven 100 mL samples of the PCE contaminated ground water ere measured, and six of the samples were treated with a doses of wood based biochar according to the present invention. Treatment dosing was performed in duplicate pairs resulting in three dosing levels. One sample in each dose pair was preserved with nitric acid, to inhibit change in the target compounds during the testing period, while the other was left unpreserved in order to determine if sample acidification has an effect on biochar's PCE absorbance properties. After the prescribed biochar dose was added to each 100 mL sample, the samples were stirred gently in order to distribute the biochar through the sample. The samples that were preserved received a dose of nitric acid, and all samples were sent to a lab for analysis. Samples were analyzed by EPA Method 8260B Volatile Organic Compounds by gas chromatography and mass spectroscopy, which separates and then detects the compound of interest in order to determine concentrations of representative organic compounds. Samples were filtered of biochar prior to analysis. Relative to the PCE level identified in the control sample, the results reproduced below in Table 5, with PCE reported in parts per billion, demonstrate that the biochar of the present invention is extremely effective in the removal, i.e., absorption, of PCE from groundwater with all removal rates greater than 99.9%. As such the biochar of the present invention particularly well suited for concentrating PCE in a subsurface treatment zone during in situ remediation of aqueous environmental media.

TABLE 5

| Sample | PCE (p.p.b.) | Percent Reduction |
|---|---|---|
| Control | 18200 | — |
| 0.5% Biochar by Weight Preserved | 2.72 | 99.99% |
| 0.5% Biochar by Weight Unpreserved | 6.75 | 99.96% |
| 1.0% Biochar by Weight Preserved | 5.83 | 99.97% |
| 1.0% Biochar by Weight Unpreserved | 1.49 | 99.99% |
| 1.5% Biochar by Weight Preserved | 5.76 | 99.97% |
| 1.5% Biochar by Weight Unpreserved | 11.25 | 99.99% |

Example 5

Samples of landfill leachate contaminated with two organic contaminants, namely polychlorinated solvents and 1,4-Dioxane were obtained for testing in Example 5. Four 100 mL samples of contaminated leachate were measured. Two of the four samples were set aside as control samples, and the remaining two samples were treated with 2.0% by weight wood based biochar according to the present invention. One control sample and one treated sample were preserved with nitric acid to inhibit change in the target compounds during the testing period. All samples were sent to a lab for analysis using EPA Method 8260B Volatile Organic Compounds by gas chromatography and mass spectroscopy, which separates and then detects the compound of interest in order to determine concentrations of representative organic compounds. The results of these tests are shown below in Table 6 in a unit of parts per billion and in which the term "ND" represented a value that was not detected. Samples were filtered of biochar prior to analysis. As is shown in table 6 below, the treated samples, including the biochar according to the present invention show non-detect levels for all chlorinated solvents and a simultaneously a removal, i.e., absorbance, rate of greater than 97% for 1,4-Dioxane. As such the biochar of the present invention is particularly well suited for concentrating multiple organic contaminates, including chlorinated solvents and 1,4-Dioxane simultaneously in a subsurface treatment zone during in situ remediation of aqueous environmental media.

TABLE 6

| Description | Control & Preserved | Biochar Treated & Preserved | Percent Reduction in Preserved Samples | Control & Unpreserved | Biochar Treated & Unpreserved | Percent Reduction in Unpreserved Samples |
|---|---|---|---|---|---|---|
| 1,1-Trichlorethane | 1.94 | ND | 100.0% | 1.88 | ND | 100.0% |
| 1,1-Dichloroethane | 5.54 | ND | 100.0% | 5.7 | ND | 100.0% |
| 1,1-Dichloroethene | 213 | ND | 100.0% | 233 | ND | 100.0% |
| 1,2-Dichloroethane | 5.19 | ND | 100.0% | 4.8 | ND | 100.0% |
| 1,4-Dioxane | 18800 | 396 | 97.9% | 21800 | 257 | 98.8% |
| Tetrachloroethene | 4.99 | ND | 100.0% | 4.83 | ND | 100.0% |
| Trichloroethene | 1.65 | ND | 100.0% | 1.57 | ND | 100.0% |

Example 6

Migration of organic vapors from landfills and environmental sites can be a public nuisance issue in terms of odor, as well as, a public health issue depending on the constituents present in the vapor. In order to determine the efficacy of using biochar to mitigate volitization of organic compounds (VOCs) from landfills and contaminated sites, samples of water, soil, and water/soil mixtures that were contaminated with a mixture of organic compounds from a landfill were analyzed using a MiniRAE 3000 photoionization detector (a VOC monitor).

Fourteen samples were prepared of various contaminated environmental media (soil, water, or a water/soil mixture): three (3) 100 grams soil samples, eight (8) 100 grams water samples, and three (3) 100 grams soil plus 40 grams water samples. Each sample was placed in a sealed 250 ml glass jar. The jars were shaken vigorously for 5 seconds. Each lid was removed from the sample jars enough to insert the probe of the photoionization detector halfway into the jar at a 45 degree downward angle to take a baseline reading of each sample, as shown in Table 7. Ten (10) of the fourteen samples were then provided with a dose of the wood based biochar according to the present invention, at a rate identified below in Table 7. Two (2) of the fourteen samples were provided with a dose of 1.5 g of activates carbon, and the two (2) remaining samples received neither biochar nor activated carbon as control groups. After dosing the samples, the closed jars were shaken vigorously for 5 seconds. 60 second after introduction of the biochar, each lid was removed from the sample jars enough to insert, the probe of the photoionization detector halfway into the jar at a 45 degree downward angle to take a reading of each sample, as shown in Table 7. The closed jars were again shaken vigorously for 5 seconds. 18 hours after introduction of the biochar or activated carbon, each lid was once again removed from the sample jars enough to insert the probe of the photoionization detector halfway into the jar at a 45 degree downward angle to take a reading of each sample as is shown in Table 7 below.

As can be seen in Table 7 below, in which photoionization detector (PID) readings of VOCs are reported in parts per billion, the introduction of the biochar according to the present invention has a significant effect on reducing the volitization of organic compounds (VOCs) within the sample jars of soil, water, and the combination of water and soil. Moreover, the reduction of VOCs in samples of similar environmental media (water, soil or both) but differing additives (biochar or activated carbon) demonstrates that the biochar is substantially more effective in the absorption, i.e., concentration and retention, of VOCs relative to activated carbon. Specifically, sample no. 13, being water with activated carbon, exhibited a PID value of 91 after 18 hours compared to sample no. 11, with an equal mass of biochar, that exhibited PID value of 1.0. Similarly, sample no. 14, being water/soil with activated carbon, exhibited a PID value of 122 after 18 hours compared to sample no. 8, also having water/soil but with less than have the mass of biochar, that exhibited PID value of only 3.8. As such, biochar according to the present invention exhibits substantially more effective absorption, i.e., concentration and retention, of VOCs relative to activated carbon.

Of further note is the increase in concentration of VOCs in untreated the control sample versus continual reduction in biochar treated samples. Accordingly, the biochar of the present invention is particularly well suited for concentrating VOC organic contaminates, as to inhibit VOC leaching from both water, soil and a combination thereof, which makes the biochar of the present invention particularly well suited for concentrating, i.e., absorbing, VOCs in the subsurface treatment zone during in situ remediation of both solid and aqueous environmental media.

TABLE 7

| Sample | Media | Basline PID | Biochar Dosing Rate | Activated Carbon Dosing Rate | 60 sec Post Treatment PID | 18 hour Post Treatment PID |
| --- | --- | --- | --- | --- | --- | --- |
| 1 | Water | 262 | 0.0 g | 0.0 g | 314 | 393 |
| 2 | Water/Soil | 334 | 0.0 g | 0.0 g | 242 | 128 |
| 3 | Soil | 37 | 1.5 g | 0.0 g | 3.1 | 2.7 |
| 4 | Water | 550 | 1.5 g | 0.0 g | 4.8 | 1.7 |
| 5 | Water | 527 | 0.5 g | 0.0 g | 6.0 | 1.9 |
| 6 | Water | 350 | 0.25 g | 0.0 g | 7.6 | 2.7 |
| 7 | Water | 351 | 0.125 g | 0.0 g | 33.0 | 5.0 |
| 8 | Water/Soil | 274 | 0.7 g | 0.0 g | 12.5 | 3.8 |
| 9 | Soil | 337 | 1.5 g | 0.0 g | 19.0 | 1.6 |
| 10 | Soil | 354 | 1.5 g | 0.0 g | 21.0 | 2.9 |
| 11 | Water | 165 | 1.5 g | 0.0 g | 0.3 | 1.0 |
| 12 | Water | 363 | 0.06 g | 0.0 g | 87.0 | 23 |
| 13 | Water | 382 | 0.0 g | 1.5 g | 183 | 91 |
| 14 | Water/Soil | 454 | 0.0 g | 1.5 g | 213 | 122 |

It should be understood that the invention is not limited in its application to the details of construction and arrangements of the components and method steps set forth herein. The invention is capable of other embodiments and of being practiced or carried out in various ways by those skilled in the art. Variations and modifications of the foregoing are within the scope of the present invention. It is also understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A method of in situ remediation of an organic contaminant comprising the steps of:
   (a) introducing a biochar slurry into a subsurface contamination zone comprising an organic contaminant;
   (b) forming a subsurface treatment zone defined by a location of the biochar slurry;
   (c) concentrating the organic contaminant from the subsurface contamination zone into the subsurface treatment zone;
   (d) introducing an oxidizing agent into the subsurface treatment zone;
   (e) catalyzing the oxidizing agent with the biochar slurry to form one or more free radicals of the oxidizing agent; and
   (f) oxidizing the organic contaminant at the subsurface treatment zone with the free radical to reduce a volume of the organic contaminant at the subsurface contamination zone.

2. The method of claim 1, wherein the biochar slurry comprises a mass of biochar particulates suspended in a volume of fluid or gas carrier.

3. The method of claim 2, wherein the mass of biochar particulates is formed of a plurality of biochar particles and wherein a substantial portion of the biochar particles have a particle diameter of between 50 microns and 4000 microns.

4. The method of claim 3, wherein a substantial portion of the biochar particles have a particle diameter of between 50 microns and 400 microns.

5. The method of claim 3, wherein the oxidizing agent is selected from a group consisting of peroxygen, persulfate, permanganate, Fenton reagents, ozone, oxygen, or a combination thereof.

6. The method of claim 5, wherein the oxidizing agent is sodium persulfate.

7. The method of claim 6, wherein the free radical of the oxidizing agent is selected from a group consisting of a sulphate radical, a hydroxyl radical, or a combination thereof.

8. The method of claim 1, wherein the organic contaminant at the subsurface treatment zone is 1,4-dioxane, and wherein the method further comprises the step of:
   reducing a pre-remediation volume of the 1,4-dioxane at the subsurface contamination zone.

9. The method of claim 8, wherein the step of concentrating the organic contaminant from the subsurface contamination zone into the subsurface treatment zone further comprises the step of:
   absorbing the pre-remediation volume of the 1,4-dioxane at the subsurface contamination zone within pores and on a surface area of biochar particulates suspended within the biochar slurry.

10. The method of claim 1, wherein the organic contaminant at the subsurface treatment zone is a polychlorinated solvent, and wherein the step of oxidizing the organic contaminant at the subsurface treatment one further comprises:
    reducing a pre-remediation volume of the polychlorinated solvent at the subsurface contamination zone.

11. The method of claim 10, wherein the step of concentrating the organic contaminant from the subsurface contamination zone into the subsurface treatment zone further comprises the step of:
    absorbing the pre-remediation volume of the polychlorinated solvent at the subsurface contamination zone within pores and on a surface area of biochar particulates suspended within the biochar slurry.

12. The method of claim 1, wherein the organic contaminant at the subsurface treatment zone is a volatile organic compound vapor, and wherein the step of oxidizing the organic contaminant at the subsurface treatment zone further comprises:
    reducing a pre-remediation volume of the volatile organic compound vapor at the subsurface contamination zone.

13. The method of claim 12, wherein the step of concentrating the organic contaminant from the subsurface contamination zone into the subsurface treatment zone further comprises the step of:
    absorbing the pre-remediation volume of the volatile organic compound vapor at the subsurface contamination zone within pores and on a surface area of biochar particulates suspended within the biochar slurry.

14. The method of claim 1, wherein the subsurface contamination zone is selected from a group consisting of groundwater, soil, sediment, landfill mass, landfill leachate, or a combination thereof.

15. The method of claim 1, further comprising the step of introducing a biological inoculation consisting of a biological nutrient media and a selected microbial agent into the subsurface treatment zone.

16. The method of claim 15, wherein the step of introducing the biological inoculation into the subsurface treatment zone occurs after introducing the oxidizing agent into the subsurface treatment zone.

17. The method of claim 16, wherein the volume of oxidizing agent at the subsurface treatment zone has been reduced to substantially zero prior to introducing the microbial agent into the subsurface treatment zone.

18. The method of claim 1, further comprising the step of:
    providing an injection well extending from a ground surface to the subsurface contamination zone; and wherein the step of introducing the biochar slurry in the subsurface contamination zone further comprises injecting the biochar through the injection well at a pressure of between 5 psi and 5000 psi.

19. The method of claim 1, wherein the subsurface contamination zone further comprises an inorganic contaminant, and wherein the method further comprised the steps of:
    introducing at least one of a zerovalent metal and an alternative reducing agent into the subsurface treatment zone; and
    reducing one or more of the organic contaminant and inorganic contaminant at the subsurface treatment zone with the at least one zerovalent metal and alternative reducing agent to reduce a volume of the contaminant at the subsurface contamination zone.

20. The method of claim 1, wherein the organic contaminant is a volatile organic compound vapor, and wherein the method further comprises the steps of:
    absorbing the volatile organic compound vapor within pores and on a surface area of biochar particulates suspended within the biochar slurry; and
    inhibiting migration of the volatile organic compound vapor from the subsurface contamination zone.

21. A method of in situ remediation of an organic contaminant comprising the steps of:
    (a) providing an injection well extending from a ground surface to a subsurface contamination zone comprising a volume of an organic contaminant
    (b) injecting a biochar slurry into the subsurface contamination zone through the injection well at a pressure of between 5 and 5,000 psi, wherein the biochar slurry comprises a mass of porous biochar particulates having a diameter of between 50 and 400 microns;
    (c) forming a subsurface treatment one defined by a location of the biochar slurry;
    (d) concentrating the organic contaminant from the subsurface contamination zone into the subsurface treatment zone;
    (e) introducing sodium persulfate into the subsurface treatment zone;
    (f) catalyzing the sodium persulfate with the biochar slurry to form one or more free radicals of the sodium persulfate; and
    (g) oxidizing the organic contaminant at the subsurface treatment zone with the free radical to reduce the volume of the organic contaminant at the subsurface contamination zone.

* * * * *